US012704005B2

(12) United States Patent
Kim et al.

(10) Patent No.: US 12,704,005 B2
(45) Date of Patent: Aug. 11, 2026

(54) DOOR HANDLE FOR VEHICLE

(71) Applicant: SL Corporation, Daegu (KR)

(72) Inventors: Jinkeun Kim, Shanghai (CN); Shenghuan Quan, Shanghai (CN)

(73) Assignee: SL Corporation, Daegu (KR)

( * ) Notice: Subject to any disclaimer, the term of this patent is extended or adjusted under 35 U.S.C. 154(b) by 64 days.

(21) Appl. No.: 18/825,828

(22) Filed: Sep. 5, 2024

(65) Prior Publication Data

US 2025/0215731 A1 Jul. 3, 2025

(30) Foreign Application Priority Data

Dec. 28, 2023 (CN) ......................... 202311845447.4
Feb. 8, 2024 (KR) ........................ 10-2024-0019283

(51) Int. Cl.
*E05B 85/10* (2014.01)
*E05B 85/16* (2014.01)

(52) U.S. Cl.
CPC ............ *E05B 85/107* (2013.01); *E05B 85/16* (2013.01)

(58) Field of Classification Search
CPC ...... E05B 85/107; E05B 85/103; E05B 85/16; E05B 81/34; E05B 5/003
See application file for complete search history.

(56) References Cited

U.S. PATENT DOCUMENTS 2,164,150 A * 6/1939 Brewster ................. E05B 5/003 292/DIG. 31
4,895,403 A * 1/1990 Osenkowski ......... E05B 85/107 292/DIG. 31
4,987,757 A * 1/1991 Feder .................... E05B 85/107 70/360
6,460,905 B2 * 10/2002 Suss ........................ E05B 85/12 292/336.3
6,598,913 B2 * 7/2003 Meinke ................. E05B 85/107 292/DIG. 31
7,552,954 B2 * 6/2009 Rozo .......................... E05B 5/00 292/DIG. 31
8,701,353 B2 * 4/2014 Patel ..................... E05B 85/103 292/201
8,733,815 B2 * 5/2014 Kwon ..................... E05B 81/34 292/336.3
8,786,401 B2 * 7/2014 Sobecki .................. E05B 81/34 340/5.1
8,807,807 B2 * 8/2014 Wheeler .................. G02B 6/00 362/501
9,033,396 B2 * 5/2015 Nam ....................... E05B 77/06 292/336.3
9,080,352 B2 * 7/2015 Aerts .................... E05B 85/103
(Continued)

*Primary Examiner* — Christine M Mills
*Assistant Examiner* — Faria F Ahmad
(74) *Attorney, Agent, or Firm* — United One Law Group LLC; Kongsik Kim; Jhongwoo Peck

(57) ABSTRACT

A door handle for a door of a vehicle includes a handle unit; and an opening/closing unit that pushes the handle unit to an exterior of a door panel or pull the handle unit to an interior of the door panel. In response to the handle unit being pressed toward the interior of the door panel while being laid flush with the door panel, the handle unit protrudes to the exterior of the door panel and switches to an open mode. In response to the handle unit being pressed while in the open mode, the handle unit retracts to the interior of the door panel and switches to a storage mode.

23 Claims, 15 Drawing Sheets

(56) References Cited

U.S. PATENT DOCUMENTS 9,103,143 B2 * 8/2015 Wheeler ................. E05B 85/18
9,151,089 B2 * 10/2015 Aerts .................... E05B 85/107
9,580,942 B2 * 2/2017 Sobecki .................. E05B 77/54
10,167,656 B2 * 1/2019 Park ........................ E05B 81/42
10,435,926 B2 * 10/2019 Brown .................. E05B 85/103
10,487,547 B2 * 11/2019 Malvy ..................... E05B 81/06
10,633,895 B1 * 4/2020 Salter ......................... F21V 9/32
10,655,371 B2 * 5/2020 Soonthornwinate .... E05B 79/06
10,731,387 B2 * 8/2020 Sobecki .................. E05B 77/54
10,995,527 B2 * 5/2021 Han ........................ E05B 85/06
11,131,126 B2 * 9/2021 Ehrlich ................... E05B 85/10
11,560,741 B2 * 1/2023 Guerin .................. E05B 85/107
11,578,512 B2 * 2/2023 Ge .......................... E05B 85/16
11,598,128 B2 * 3/2023 Murata ................. E05B 85/103
11,643,856 B2 * 5/2023 Jeong .................... E05B 85/107 292/336.3
11,661,762 B2 * 5/2023 Smart ................... E05B 85/107 292/336.3
11,679,651 B2 * 6/2023 Couto Maquieira .. B60J 5/0416 292/336.3
11,686,133 B2 * 6/2023 Couto Maquieira ... E05B 81/90 292/336.3
11,746,575 B2 * 9/2023 Cervone ................. E05B 85/16 292/336.3
11,920,387 B2 * 3/2024 Velicanin ................ E05B 81/06
11,976,496 B2 * 5/2024 Amante ................ B64C 1/1461
12,146,347 B2 * 11/2024 Kulicki ..................... B60R 7/04
12,180,757 B2 * 12/2024 Wilke ................... E05B 85/107
12,312,844 B2 * 5/2025 Moriyama ............ E05B 85/107
12,326,019 B2 * 6/2025 Kuniyil ................. E05B 85/103
12,385,297 B2 * 8/2025 Herman .................. B60R 13/04
12,385,298 B2 * 8/2025 Peynot .................. E05B 85/103
2010/0127516 A1 * 5/2010 Fannon ................... E05B 79/12 292/336.3
2013/0127185 A1 * 5/2013 Lang ....................... E05B 81/77 292/336.3
2013/0241215 A1 * 9/2013 Halliwell .............. E05B 85/107 292/336.3
2016/0281397 A1 * 9/2016 Park ........................ E05B 81/36
2016/0298366 A1 * 10/2016 Och ...................... E05B 85/103
2017/0260780 A1 * 9/2017 Christensen .......... E05B 85/103
2018/0058113 A1 * 3/2018 Han ...................... E05B 85/103
2018/0106082 A1 * 4/2018 Brown .................. E05B 85/107
2018/0148957 A1 * 5/2018 Och ........................ E05B 81/76
2018/0163436 A1 * 6/2018 Richards ................. E05B 79/06
2018/0163442 A1 * 6/2018 Soonthornwinate .... E05B 81/76
2018/0171686 A1 * 6/2018 Couto Maquieira . E05B 85/107
2018/0274271 A1 * 9/2018 Och ........................ E05B 77/06
2018/0298653 A1 * 10/2018 Medina Huerta ....... E05B 85/16
2019/0003216 A1 * 1/2019 Wilke ..................... E05B 85/16
2019/0055760 A1 * 2/2019 Manikkath ............. E05B 79/20
2019/0178012 A1 * 6/2019 Park ...................... E05B 85/107
2019/0211592 A1 * 7/2019 Bextermöller .......... E05B 81/78
2019/0234117 A1 * 8/2019 Bextermöller ........ E05B 85/103
2019/0234122 A1 * 8/2019 Löw ...................... E05B 85/103
2019/0257124 A1 * 8/2019 Löw ...................... E05B 85/103
2019/0284850 A1 * 9/2019 Couto Maquieira . E05B 85/103
2019/0368239 A1 * 12/2019 Rhein ................... E05B 85/103
2020/0071973 A1 * 3/2020 Han ........................ E05B 79/06
2020/0102773 A1 * 4/2020 Sobecki ................ E05B 85/103
2020/0131814 A1 * 4/2020 Kuniyil ................... E05B 85/14
2020/0173204 A1 * 6/2020 Murata ................... E05B 81/76
2020/0181940 A1 * 6/2020 Fujiwara ................... E05B 7/00
2020/0190848 A1 * 6/2020 Murata ................... E05B 81/14
2020/0199918 A1 * 6/2020 Couto Maquieira ... E05B 81/90
2020/0354996 A1 * 11/2020 Bresser ................. E05B 85/103
2021/0156178 A1 * 5/2021 Heyduck ................. E05B 81/42
2021/0156179 A1 * 5/2021 Savant .................. E05B 85/107
2021/0172218 A1 * 6/2021 Velicanin .............. E05B 85/107
2021/0195768 A1 * 6/2021 Reifenberg ............. E05B 79/06
2021/0285264 A1 * 9/2021 Couto Maquieira ... E05B 81/90
2021/0404226 A1 * 12/2021 Guerin .................... E05B 81/76
2022/0018167 A1 * 1/2022 Rocci .................... E05B 85/103
2022/0018168 A1 * 1/2022 Cervone ................. E05B 85/16
2022/0042356 A1 * 2/2022 Herdering ............... E05B 81/42
2022/0170298 A1 * 6/2022 Wilke ..................... E05B 77/42
2022/0205288 A1 * 6/2022 Carmo ................ E05B 47/0038
2022/0282533 A1 * 9/2022 Schütz .................... E05B 81/06
2023/0030402 A1 * 2/2023 Sakamoto ............... E05B 81/06
2023/0033811 A1 * 2/2023 Sakamoto ............. E05B 85/103
2023/0133814 A1 * 5/2023 Kuniyil ................. E05B 85/107 70/208
2023/0184008 A1 * 6/2023 Kuniyil ................. E05B 85/107 296/1.02
2023/0258029 A1 * 8/2023 Philippe ................ E05B 85/103 70/277
2023/0323710 A1 * 10/2023 Toyama .................. E05B 79/06
2023/0358079 A1 * 11/2023 Peynot .................... E05B 77/42
2023/0417089 A1 * 12/2023 Sharma ................. E05B 85/107
2023/0417090 A1 * 12/2023 Guerin .................. E05C 19/022
2024/0018808 A1 * 1/2024 Guerin .................. E05B 85/103
2024/0076915 A1 * 3/2024 LaCross .................. E05B 81/04
2024/0271472 A1 * 8/2024 Yu ......................... E05B 85/103
2024/0309682 A1 * 9/2024 Chen ....................... E05B 81/77
2024/0392616 A1 * 11/2024 Yu ......................... E05B 85/103
2024/0418017 A1 * 12/2024 Namannavar ......... E05B 85/107
2024/0418018 A1 * 12/2024 Zhou ....................... E05B 85/18
2025/0101768 A1 * 3/2025 Zerbe ...................... E05B 85/10

* cited by examiner

DOOR HANDLE FOR VEHICLE

CROSS-REFERENCE TO RELATED APPLICATIONS

This application claims priority from Korean Patent Application No. 10-2024-0019283 filed on Feb. 8, 2024 and Chinese Patent Application No. 202311845447.4 filed on Dec. 28, 2023. The aforementioned applications are incorporated herein by reference in their entireties.

BACKGROUND

1. Technical Field

The present disclosure relates to a door handle for a vehicle and, more particularly, to a flush door handle for a vehicle, which is installed inside the door of the vehicle and can be manually exposed to the exterior of the door in an emergency situation.

2. Description of the Related Art

Generally, door handles installed on vehicle doors are provided in various forms depending on the vehicle models. These vehicle door handles are typically classified into two types, i.e., grip type and lift-up type, based on their operation direction and form. These two types have a structure where users can open the door by inserting their hand into the exposed space and pulling or rotating the handle.

In the case of the lift-up type, a space for inserting a hand is separately formed between the handle part and the outer side of the door panel. This not only imposes design constraints but also frequently allows outside air to enter the interior through the operating part of the outside handle during high-speed driving.

Additionally, the grip type offers a more aesthetic appearance due to the absence of a housing part compared to the lift-up type, but a separate hand insertion space still needs to be formed on the exterior of the door panel, imposing design constraints.

To address these air infiltration and design constraints, hidden-type flush door handles are being developed.

However, these hidden-type flush door handles may not protrude from the door in cases where the vehicle's power is drained or in emergency situations, leading to issues in opening the door during such emergencies.

SUMMARY

Aspects of the present disclosure provide a flush door handle for a vehicle, which is installed inside the door of the vehicle and can be manually exposed to the exterior of the door when necessary (e.g., in an emergency situation).

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a door handle for a door of a vehicle may include a handle unit; and an opening/closing unit that pushes the handle unit to an exterior of a door panel or pull the handle unit to an interior of the door panel. In response to the handle unit being pressed toward the interior of the door panel while being laid flush with the door panel, the handle unit protrudes to the exterior of the door panel and switches to an open mode. In response to the handle unit being pressed while in the open mode, the handle unit retracts to the interior of the door panel and switches to a storage mode.

The opening/closing unit may include a link part, which is connected to both sides of the interior of the handle unit and is disposed to be rotatable. The link part may include a first link, which is connected to a first side of the handle unit, and a second link, which is connected to a second side of the handle unit.

The opening/closing unit may include an operating part, which moves the link part so that components of the link part move away from or closer to each other. The operating part may include a first rack gear, which is connected to a first side of the link part, a second rack gear, which is connected to a second side of the link part, and a pinion gear, which engages simultaneously between the first rack gear and the second rack gear. The first rack gear and the second rack gear may be arranged side by side to face each other with respect to the pinion gear, and may be disposed to move linearly in opposite directions according to the rotation of the pinion gear. The pinion gear may include an engagement area, which contacts the first rack gear and the second rack gear, and an extension area, which protrudes from a center of the engagement area and interacts with a biasing part. The opening/closing unit may include a biasing part, which provides a biasing force or torque to cause the first rack gear and the second rack gear to move away from each other.

The door handle may further include a driving part that actuates the operating part to switch between the open mode and the storage mode.

The door handle may further include a cover part that covers the operating part.

The door handle may further include a mode setting unit interposed between the first rack gear and the second rack gear to selectively limit movement of the operating part when switching from the open mode to the storage mode. The mode setting unit may include: a protruding part, which is mounted on one of the first rack gear or the second rack gear; and an engagement part, which is mounted on the other of the first rack gear or the second rack gear and is disposed to rotate while being engaged with the protruding part. The operating part may include: a first fixing member, which is for mounting the protruding part; and a second fixing member, which is disposed to face the first fixing member and is provided for mounting the engagement part. As the first fixing member and the second fixing member move toward each other, the protruding part may pass through the engagement part.

The engagement part may include: a hollow ring member, which is mounted on the second fixing member and is disposed to be rotatable; and at least one key member, which protrudes from an inner circumferential surface of the ring member. The protruding part may include: a head member, which is mounted on the first fixing member; a shaft, which extends from the head member and protrudes toward the second fixing member; first guide patterns, which protrude from an outer circumferential surface of the shaft and include first inclined surfaces that are formed to contact the key member in a first direction, the first direction being a direction in which the engagement part engages with the protruding part; and second guide patterns, which protrude from the outer circumferential surface of the shaft and include a plurality of second inclined surfaces formed to contact the key member in a second direction, the second direction being a direction in which the engagement part disengages from the protruding part.

The opening/closing unit may be configured to operate in the following manner. In response to the handle unit being pressed with a pressing force while in the open mode, the key member may contact one of the first inclined surfaces in the first direction, causing the engagement part to rotate, and in response to the pressing force being released, the engagement part may be biased toward the second direction by the biasing part to be disposed on one of the second inclined surfaces, thereby switching to the storage mode. Subsequently, in response to the handle unit being pressed with a pressing force while in the storage mode, the key member may contact one of the first inclined surfaces in the first direction, causing further rotation of the engagement part, and in response to the pressing force being released, the engagement part may be biased toward the second direction by the biasing part to abut an adjacent second inclined surface and then be released from the second guide pattern, thereby switching to the open mode.

The first inclined surfaces and the second inclined surfaces may be disposed to at least partially overlap with each other along a circumferential direction.

The engagement part may be disposed to contact at least one inclined surface from among the first inclined surfaces and the second inclined surfaces when moving between the first guide patterns and the second guide patterns in the first direction or the second direction.

The door handle may further include a housing for accommodating the opening/closing unit and guiding movement of the handle unit. The operating part may include a connecting member, which protrudes from the first fixing member and is connected to one end of the link part. The connecting member may include a connecting groove, which interferes with a connecting pin coupled to the one end of the link part along the first direction or along the second direction. The interference between the connecting pin and the connecting groove may be released along a third direction, the third direction being perpendicular to the first direction and the second direction.

The housing may include: a first guide groove, which is formed along the first direction and the second direction and in which the connecting pin is at least partially inserted to guide movement of the connecting pin; and a second guide groove, which is disposed to communicate with an end of the first guide groove and guides movement of the connecting pin along the third direction. In the open mode, in response to the handle unit being pulled, the connecting pin may move along the second guide groove, and the door may be opened.

The housing may further include a restoring part, which is disposed to be rotatable relative to the housing and elastically limits the movement of the connecting pin. The restoring part may include: a protruding piece, which abuts the connecting pin as the connecting pin moves from the first guide groove to an end of the second guide groove; a support piece, which supports the protruding piece to be rotatable on the housing; a cable release, which includes a connecting piece that protrudes in a different direction from the protruding piece on the support piece and to which a cable is connected; and an elastic member, which is coupled to the support piece and elastically rotates the cable release such that the connecting piece is disposed by the protruding piece at a junction between the first guide groove and the second guide groove or on the first guide groove. The housing may further include a rotation prevention part, which is disposed adjacent to the restoring part to be rotated by an external impact on the housing, and the rotation prevention part may rotate to interfere with a rotation direction of the cable release when the external impact is received.

Specific details of other embodiments are included in the detailed description and drawings.

According to the door handle for a vehicle of the present disclosure, first, the door of the vehicle can be opened by manually projecting the handle unit to the outside of the door panel, even in emergency situations where the vehicle's battery is discharged or the driving part is inoperative.

Second, the opening/closing unit can be manufactured in a compact and lightweight manner, making it easier to apply to a flush door.

Third, since the driving part is disposed to avoid interference with the operating part when it does not press the operating part, interference with the driving part can be avoided during the manual operation of the handle unit.

It should be noted that the effects of the present disclosure are not limited to those described above, and other effects of the present disclosure will be apparent from the following description.

BRIEF DESCRIPTION OF THE DRAWINGS

The detailed description of the exemplary embodiments of this application described below, as well as the summary described above, will be better understood when read in conjunction with the accompanying drawings. The drawings illustrate exemplary embodiments of the present disclosure for illustrative purposes. However, it should be understood that the disclosure is not limited to the exact arrangements and means shown.

DETAILED DESCRIPTION

Figure 1:
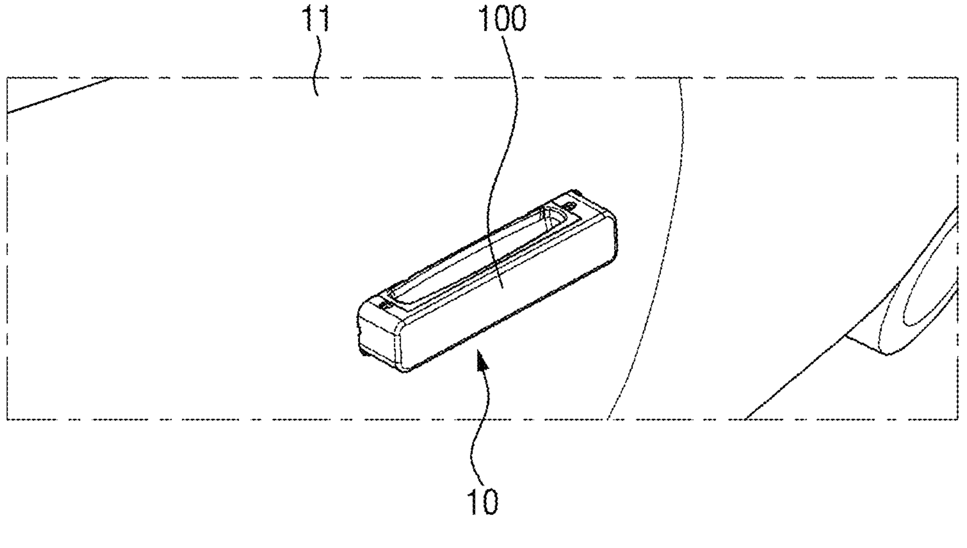
FIG. 1 is a reference diagram illustrating a state in which a flush door handle for a vehicle according to an embodiment of the present disclosure is installed on a vehicle.

Exemplary embodiments of the present disclosure will hereinafter be described in detail with reference to the accompanying drawings. The advantages and features of the present disclosure, and methods for achieving them, will become apparent by referring to the embodiments described in detail below in conjunction with the accompanying drawings. However, it should be understood that the present disclosure is not limited to the embodiments disclosed below but can be implemented in various different forms, and the embodiments are provided to make the disclosure of the present disclosure more complete and to fully inform those skilled in the art of the scope of the disclosure. The present disclosure is defined only by the scope of the claims. Throughout the specification, the same reference numerals refer to the same components.

The present disclosure can undergo various modifications and have various embodiments, and specific embodiments will be illustrated and described in the drawings. However, this is not intended to limit the present disclosure to such specific embodiments, and it should be understood to include all modifications, equivalents, and alternatives within the spirit and scope of the disclosure.

Terms including ordinal numbers such as first, second, etc., may be used to describe various components, but these components are not limited by these terms. These terms are used only to distinguish one component from another. For example, a second component can be named a first component without departing from the scope of the present disclosure, and similarly, a first component can be named a second component.

The term "and/or" includes any combination of one or more of the associated listed items or any of the listed items individually.

When a component is said to be "connected to" or "coupled to" another component, it may be directly connected or coupled to the other component, or intervening components may be present. Conversely, when a component is said to be "directly connected to" or "directly coupled to" another component, there are no intervening components.

The terms used in this disclosure are for the purpose of describing particular embodiments only and are not intended to limit the present disclosure.

Unless the context clearly indicates otherwise, the singular forms include the plural forms as well.

In this disclosure, the terms "comprising" or "having" are intended to specify the presence of stated features, numbers, steps, operations, elements, components, or combinations thereof, but do not preclude the presence or addition of one or more other features, numbers, steps, operations, elements, components, or combinations thereof.

Embodiments will hereinafter be described with reference to the accompanying drawings, wherein the same or corresponding components, regardless of the drawing numbers, are assigned the same reference numbers, and redundant descriptions will be omitted.

FIG. 1 is a reference diagram illustrating a state in which a flush door handle for a vehicle according to an embodiment of the present disclosure is installed on a vehicle.

Referring to FIG. 1, a flush door handle 10 for a vehicle may operate in an open mode where a handle unit 100 protrudes from the surface of a door 11 of the vehicle, or in a storage mode where the handle unit 100 is inserted flush with the surface of the door 11. Generally, the flush door handle 10 for a vehicle uses the vehicle's electric power (e.g., from the batteries) to automatically project and expose the handle unit 100 to the exterior when the door 11 is being opened, and the handle unit 100 may be stored inside the door 11, being level with the surface of the door 11, when the vehicle is in operation.

Further, the handle unit 100 may be manually projected by a user to switch to the open mode if the battery is discharged or if the power is lost due to, e.g., an accident of the vehicle.

Figure 2:
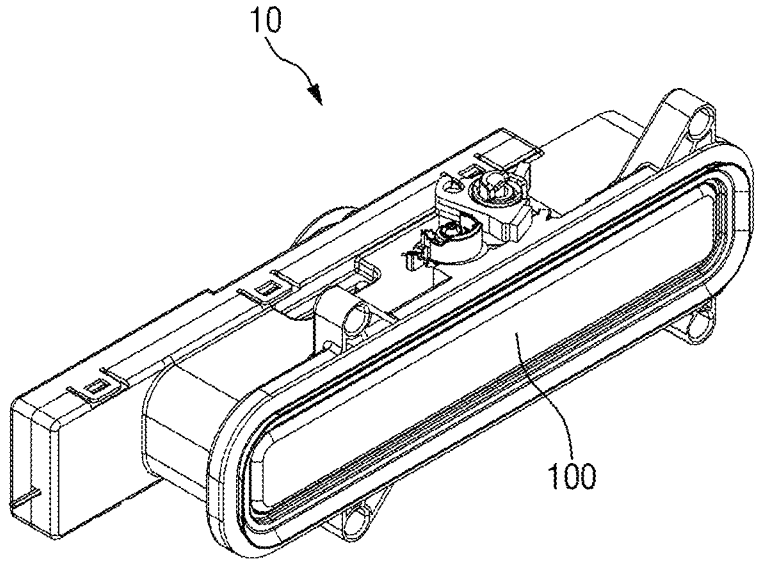
FIG. 2 is a perspective view illustrating the flush door handle for a vehicle depicted in FIG. 1.
Figure 3:
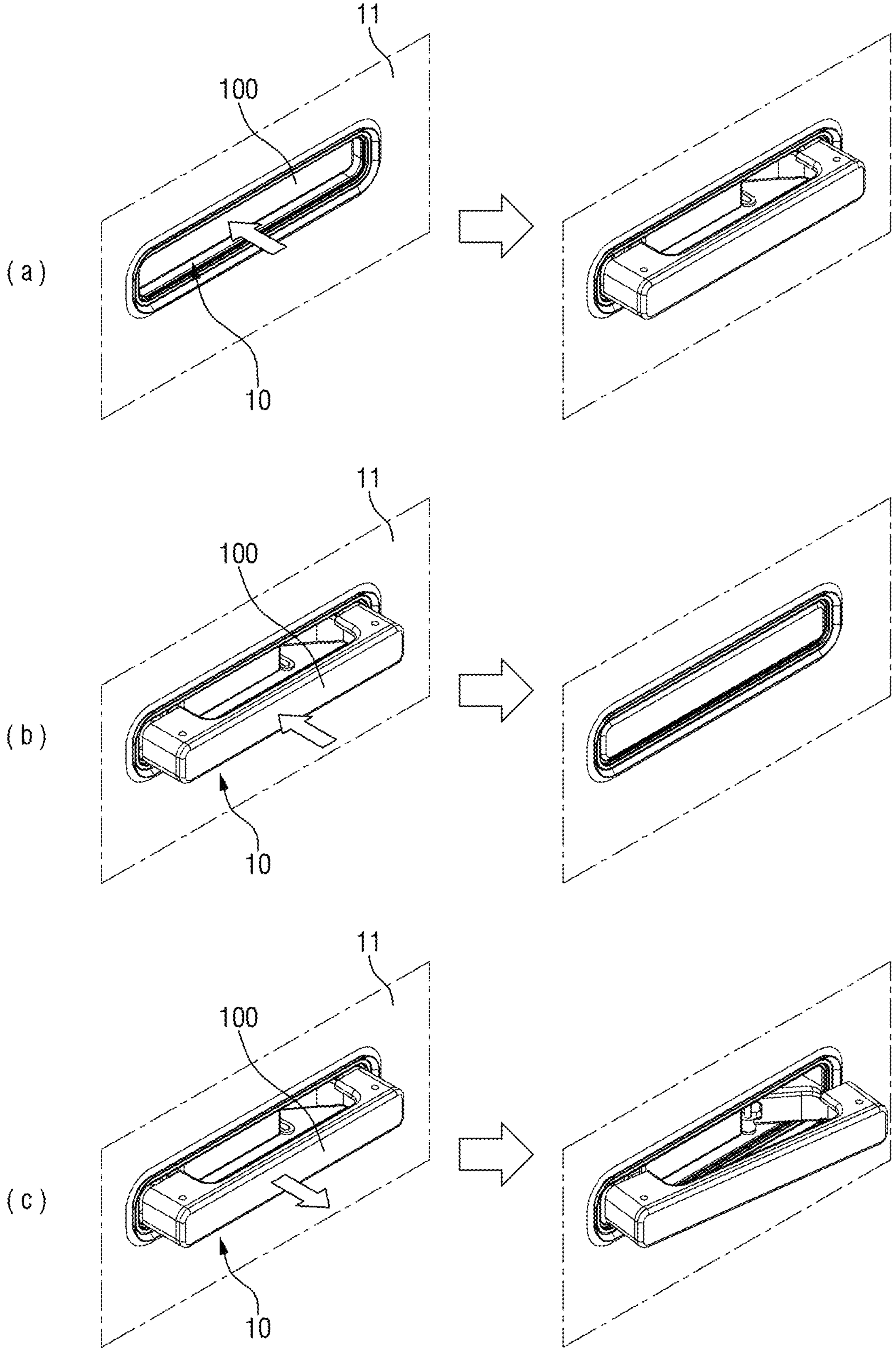
FIG. 3 illustrates reference diagrams for explaining the operation of the flush door handle for a vehicle depicted in FIG. 2.

FIG. 2 is a perspective view illustrating the flush door handle for a vehicle depicted in FIG. 1, and FIG. 3 illustrates reference diagrams for explaining the operation of the flush door handle for a vehicle depicted in FIG. 2.

Referring to FIGS. 2 and 3, in a situation where the flush door handle 10 for a vehicle cannot be operate automatically using the vehicle's electric power, a user may manually switch between the open mode and the storage mode.

First, when in the storage mode, where the handle unit 100 is disposed inside the vehicle door 11, the user may press the handle unit 100. In response, the handle unit 100 may be depressed into the door 11 by a predetermined distance and may then protrude to the exterior of the door 11, thereby switching to the open mode.

In this state, when the user presses the handle unit 100 once again, the handle unit 100 may be inserted back into the door 11 by a predetermined distance until it is level and flush with the surface of the door 11, thereby switching to the storage mode.

Furthermore, while in the open mode, where the handle unit 100 is projected outside the door 11, when the user pulls out the handle unit 100 further, one side of the handle unit 100 may elastically swing open, allowing the door 11 to be opened in a release mode. In the release mode, wires connected to a door lock may cause the door 11 to be opened.

Figure 4:
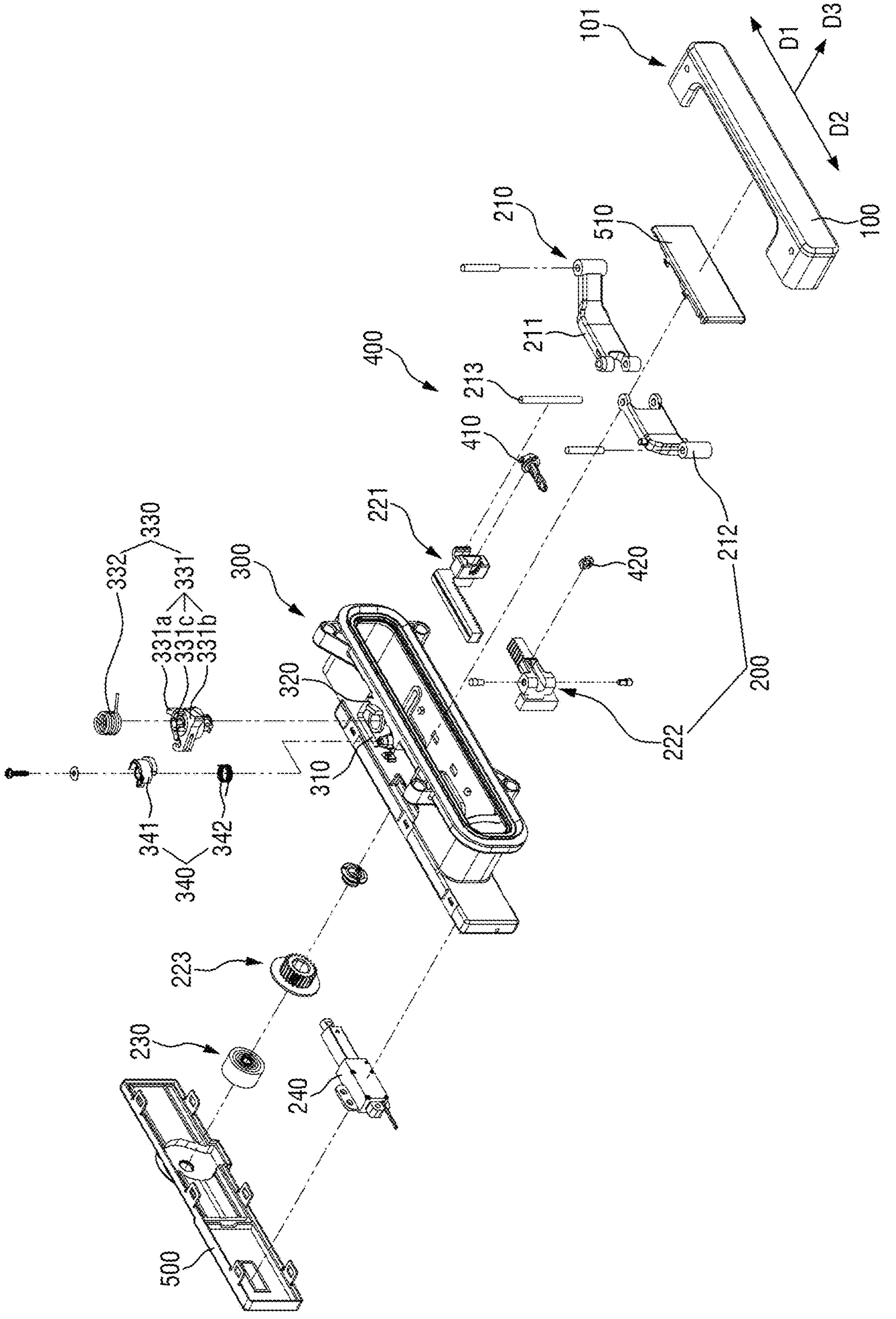
FIG. 4 is an exploded perspective view illustrating the flush door handle for a vehicle depicted in FIG. 2 in a disassembled state.
Figure 5A:
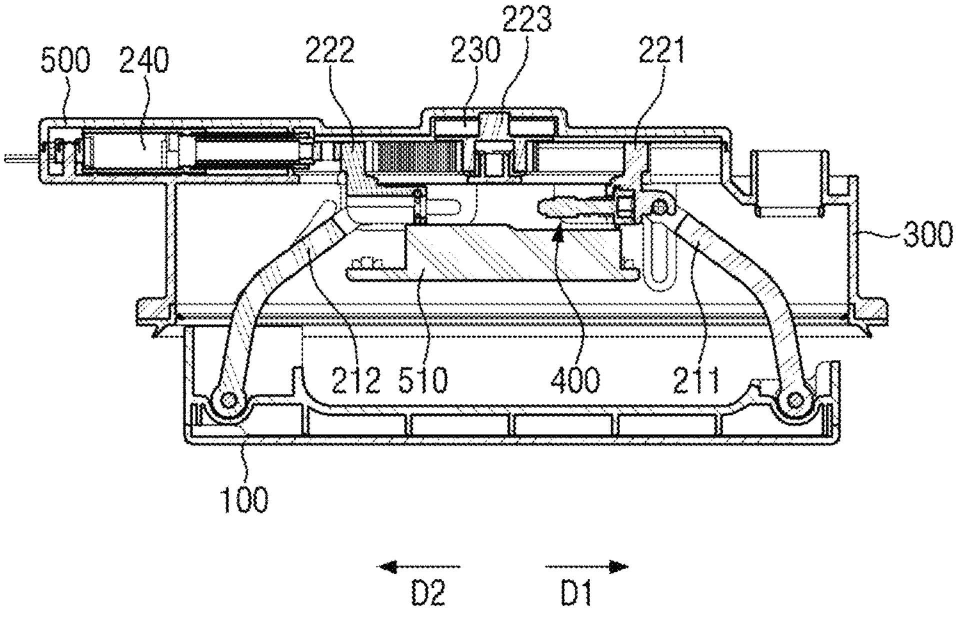
FIGS. 5A and 5B illustrate longitudinal cross-sectional views for explaining an open mode (FIG. 5A), where the flush door handle for a vehicle depicted in FIG. 2 protrudes outside the door, and a storage mode (FIG. 5B).
Figure 5B:
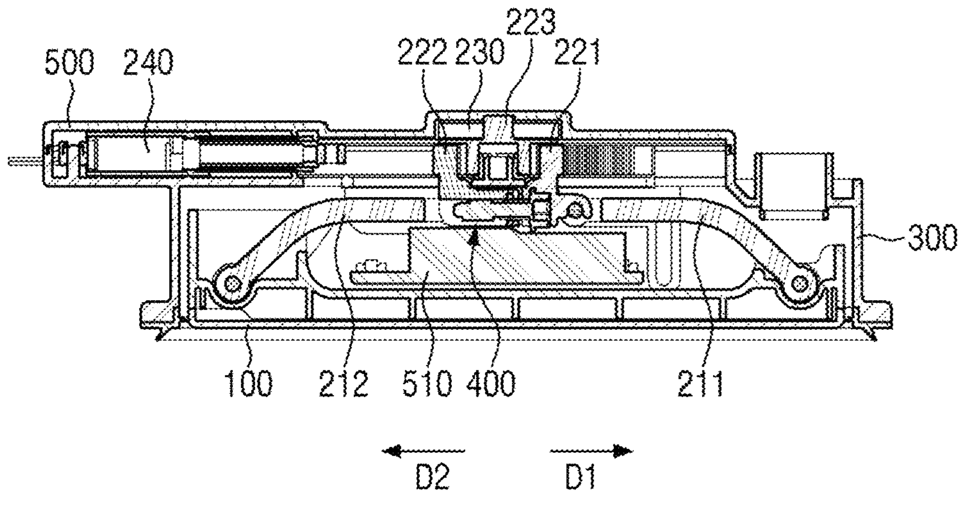
Figure 6A:
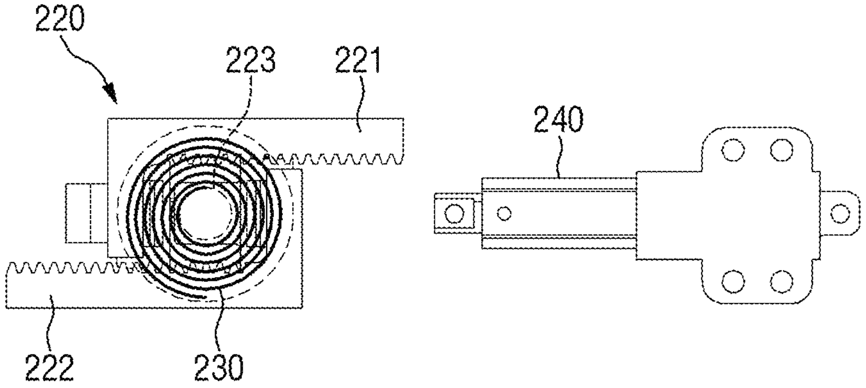
FIGS. 6A and 6B illustrate rear views for explaining an operating part and a biasing part of the flush door handle for a vehicle depicted in FIG. 2 in the storage mode and open mode, respectively.
Figure 6B:
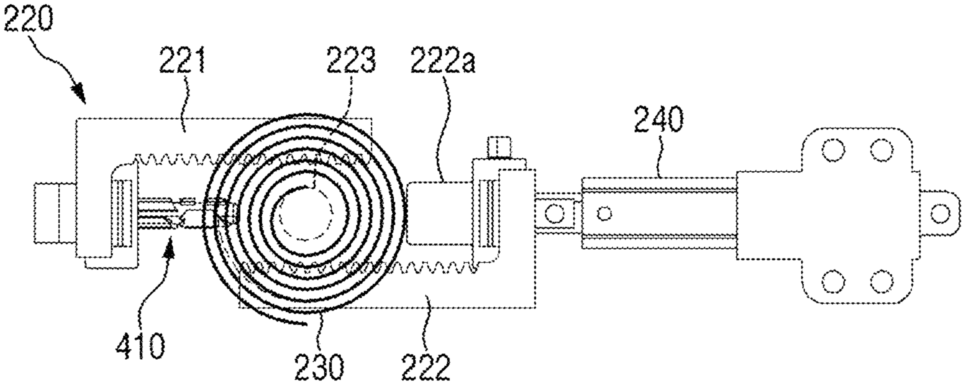

FIG. 4 is an exploded perspective view illustrating the flush door handle for a vehicle depicted in FIG. 2, FIG. 5A illustrates a longitudinal cross-sectional view corresponding to the open mode, where the flush door handle for a vehicle depicted in FIG. 2 protrudes outside the door, and FIG. 5B illustrates a longitudinal cross-sectional view corresponding to the storage mode. FIGS. 6A and 6B illustrate rear views for explaining an operating part and a biasing part of the flush door handle for a vehicle depicted in FIG. 2 in the storage mode (FIG. 6A) and open mode (FIG. 6B).

Referring to FIGS. 4 through 6B, the flush door handle 10 for a vehicle may include the handle unit 100 and an opening/closing unit 200. Here, the opening/closing unit 200 may switch the handle unit 100 to the open mode, causing the handle unit 100 to protrude outwardly from the door 11 (shown in FIG. 1) in response to the handle unit 100 being pressed in a direction toward the inside of the door 11. In response to the handle unit 100 being pressed again, the opening/closing unit 200 may switch the handle unit 100 to the storage mode, causing the handle unit 100 to be withdrawn and stored within the door 11.

In some embodiments, the flush door handle 10 may be implemented as an assembly that is wholly detachable from the door 11. In some other embodiments, it may be structured so that the door 11 itself functions as a housing, with the handle unit 100 and the opening/closing unit 200 installed inside the door 11 without a separate housing.

An example will hereinafter be described for an example where the flush door handle 10 for a vehicle includes a housing 300 installed within the door 11. However, the present disclosure is not limited thereto, and the description may be similarly applicable to embodiments where the flush door handle 10 is implemented without a dedicated housing within the door 11.

First, the handle unit 100 may provide a function (e.g., a release mode) of unlocking the door 11 when the user grasps the handle unit 100 to open the door 11. For example, in the case of a flush door handle type, where the handle unit 100 enters and exits the inside of the door 11 in a sliding manner, a gripping space 101 may be formed within the handle unit 100 where the user's hand can enter.

The handle unit 100 may be configured to have the same shape, finish, and/or color as the exterior surface of the door 11 to maintain a sense of unity with the door 11. For example, if the flush door handle 10 for a vehicle is disposed in the curved area of the door 11, the outer surface of the handle unit 100 may be formed as a curved surface corresponding to the curvature of the exterior of the door panel.

The handle unit 100 may selectively move to protrude toward the outside of the door 11 from within the housing 300 or to retract into the housing 300. When the handle unit 100 protrudes to the outside of the surface of the door 11, the user may grasp and pull the handle unit 100 to open the door 11. Additionally, the housing 300 may provide a space inside thereof for the handle unit 100 to move, and may accommodate an operating structure that allows the handle unit 100 to enter and exit the door 11 via the opening/closing unit 200. The housing 300 may be configured to install the flush door handle 10 for a vehicle inside the door 11, and additional securing means may be provided to fasten the housing 300 to the inside of the door 11 depending on the structure or size of the door 11.

The opening/closing unit 200 may include a link part 210, an operating part 220, a biasing part 230, and a driving part 240.

First, the link part 210 may be connected to both sides of the interior of the handle unit 100 and may be disposed to be rotatable. For example, the link part 210 may include a first link 211, which is coupled to one side of the rear of the handle unit 100, and a second link 212, which is coupled to the other side of the rear of the handle unit 100. The link part 210 may have a shape that is bent or curved going from one end to the other.

Furthermore, the operating part 220 may be coupled to one end (e.g., a distal end) of the first link 211 and one end (e.g., a distal end) of the second link 212, and may move the distal ends of the first and second links 211 and 212 either away from or closer to each other.

The operating part 220 may include a first rack gear 221, a second rack gear 222, and a pinion gear 223. The first and second rack gears 221 and 222 may be arranged side by side facing each other with a pinion gear 223 disposed in the middle, and may be configured to move rectilinearly in opposite directions as the pinion gear 223 rotates. The first rack gear 221 may include a first fixing member 221*a*, to which one side of a mode setting unit 400, which will be described later, is mounted. The first fixing member 221*a* may include a connecting member 221*b*, to which one end of the first link 211 is rotatably connected. The connecting member 221*b* may include a connecting groove 221*c*, into which a connecting pin 213 that connects the first link 211 and the connecting member 221*b* is inserted.

The second rack gear 222 may include a second fixing member 222*a*, to which the other side of the mode setting unit 400 that will be described later is mounted. The second fixing member 222*a* may be disposed to face the first fixing member 221*a*.

Further, the pinion gear 223 may include an engagement area 224 and an extension area 225. The engagement area 224 may be disposed to contact and engage with the teeth of the first and second rack gears 221 and 222. For example, the first and second rack gears 221 and 222 may be formed as linear gears, and the pinion gear 223 may be formed as a circular rotating gear, allowing for a rack-and-pinion configuration. The extension area 225 may protrude from the center of the engagement area 224 and may be disposed to interfere with the biasing part 230.

The biasing part 230 may provide a biasing force or torque to the operating part 220 so that the link part 210 may move in the direction where the first and second links 211 and 212 move away from each other. For example, the biasing part 230 may be formed as a reel spring or mainspring structure, with its one end fixed to the extension area 225 and the other end fixed to a cover part 500. The cover part 500 may surround the biasing part 230 and the extension area 225, and may cover at least parts of the operating part 220 and the driving part 240.

The driving part 240 may be configured as an actuator capable of linear reciprocating motion. The driving part 240 may be driven using the vehicle's battery power. In a normal state where power can be supplied to the door handle 10, the driving part 240 may automatically set the flush door handle 10 to the open mode or storage mode by selectively pressing the first rack gear 221 and or the second rack gear 222. At this time, the driving part 240 may push one of the first and second rack gears 221 and 222 in the direction where the first and second rack gears 221 and 222 come closer to each other. The distance by which the driving part 240 pushes the first rack gear 221 or the second rack gear 222 may be shorter in the storage mode and longer in the open mode. However, the driving part 240 may be configured to uniformly push the first or second rack gear 221 or 222 until the first and second rack gears 221 and 222 come close together in a predefined range. In this embodiment, the driving part 240 will hereinafter be described as pushing the first rack gear 221.

Further, the flush door handle 10 for a vehicle may include the mode setting unit 400. The mode setting unit 400 may be interposed between the first and second rack gears 221 and 222 and may selectively restrict the movement of the operating part 220 during the mode switching. The mode setting unit 400 may include a protruding part 410 and an engagement part 420. The protruding part 410 may be disposed on one of the first rack gear 221 or the second rack gear 222, and the engagement part 420 may be disposed on the other of the first rack gear 221 or the second rack gear 222. In this embodiment, the protruding part 410 will hereinafter be described as being disposed on the first rack gear 221, and the engagement part 420 will hereinafter be described as being installed on the second rack gear 222.

When the first and second rack gears 221 and 222 are brought close to each other, the protruding part 410 and the engagement part 420 may engage with each other. When the first and second rack gears 221 and 222 are moved apart, the protruding part 410 and the engagement part 420 may either remain engaged by contact or may be separated after making contact.

The protruding part 410 may include a head member 411, a shaft 412, first guide patterns 413, and second guide patterns 415. The head member 411 may be mounted on the first fixing member 221*a*. The shaft 412 may extend from the head member 411 and may protrude toward the second fixing member 222*a*. The first guide patterns 413 may protrude from the outer circumferential surface of the shaft 412 in both the circumferential direction and the longitudinal direction of the shaft 412 and may include first inclined surfaces 414 (see FIG. 10), which are provided to contact the engagement part 420 when they engage with the engagement part 420 at the tip of the shaft 412. A plurality of first guide patterns 413 may be provided side by side on the outer circumferential surface of the shaft 412.

The second guide patterns 415 may protrude from the outer circumferential surface of the shaft 412 in both the circumferential direction and the longitudinal direction of the shaft 412, may be disposed closer to the tip of the shaft 412 compared to the first guide patterns 413, and may include second inclined surfaces 416 (see FIG. 10), which face and overlap at least in part with the first inclined surfaces 414 along the circumferential direction of the shaft 412. A plurality of second guide patterns 415 may be provided side by side on the outer circumferential surface of the shaft 412.

The engagement part 420 may include a ring member 421 and a key member 422. The ring member 421 may have a hollow circular ring (e.g., annular) shape and may be mounted inside the second fixing member 222*a*. The ring member 421 may be disposed to rotate relative to the second fixing member 222*a*. The ring member 421 and the key member 422 may be formed integrally. The key member 422 may protrude from the inner circumferential surface of the ring member 421. The key member 422 may interact with the protruding part 410.

When the handle unit 100 is pressed, the engagement part 420 may be moved in a first direction D1, and the first inclined surfaces 414 and the key member 422 may contact. Due to the inclination angle of the first inclined surfaces 414, the interference member 420 may be rotated. Then, when the pressing force is released, the interference member 420 may be moved in a second direction D2 due to the restoration force from the biasing part 230. Consequently, the engagement part 420 may be stopped by abutting one of the second inclined surfaces 416. This position corresponds to the storage mode.

When the handle unit 100 is pressed in the storage mode, the key member 422 may contact the next first inclined surface 414 in the first direction D1 and may further rotate the engagement part 420. Then, when the pressing force is released, the engagement part 420 may contact the next neighboring second inclined surface 416 in the second direction D2 due to the action of the biasing part 230, disengaging from the second guide patterns 415 and switching to the open mode. More detailed description of the engagement and disengagement between the engagement part 420 and the protruding part 410 will be provided later below with reference to FIGS. 11A-11C.

The housing 300 may accommodate the handle unit 100 and the opening/closing unit 200 therein. The housing 300 may include a first guide groove 310, a second guide groove 320, a restoring part 330, and a rotation prevention part 340.

The first guide groove 310 may be formed lengthwise along the first direction D1 or the second direction D2. A connecting pin 213 may be inserted at least in part into the first guide groove 310 so that the moving direction of the connecting pin 213 may be guided. For example, the first guide groove 310 may be formed rectilinearly along a horizontal direction.

Figure 12:
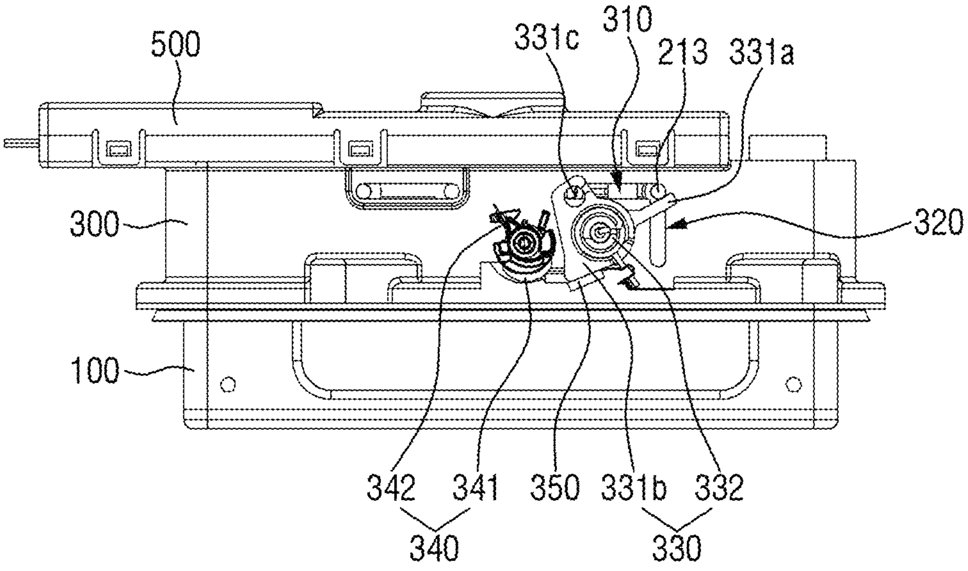
FIGS. 12 and 13 are plan views illustrating the operation of the restoring part provided on the housing of the flush door handle for a vehicle depicted in FIG. 2.

Additionally, the second guide groove 320 may be disposed to communicate with the first guide groove 310 along a third direction D3 (see FIG. 4), which is perpendicular to the first or second direction D1 or D2. For example, the second guide groove 320 may be formed rectilinearly along a vertical direction as shown in FIG. 12 (which is a direction substantially normal to the exterior surface of the door panel).

When the connecting pin 213 moves along the second guide groove 320, the handle unit 100 may be pulled by the user from the open mode into the release mode, allowing the connecting pin 213 to move together with the first link 211 through the second guide groove 320, and as a result, the door 11 may be opened.

The restoring part 330 may elastically restrict the movement of the connecting pin 213 along the second guide groove 320. The restoring part 330 may include a cable release 331 and an elastic member 332. The cable release 331 may include a protruding piece 331*a*, a support piece 331*b*, and a connecting piece 331*c*. The protruding piece 331*a* may contact the tip of the connecting pin 213, which protrudes over the first or second guide groove 310 or 320. For example, the protruding piece 331*a* may elastically interfere when the connecting pin 213 moves in the third direction D3 along the second guide groove 320.

Furthermore, the support piece 331*b* may support the protruding piece 331*a* to be rotatable on the housing 300. In other words, the support piece 331*b* may be a rotating body on the housing 300, and the protruding piece 331*a* may be an element that protrudes from the support piece 331*b* to have a larger rotation radius.

The connecting piece 331*c* may protrude from the support piece 331*b*, allowing a cable to be connected. Obviously, the connecting piece 331*c* may be positioned in a direction different from the protruding piece 331*a* around the support piece 331*b*.

The elastic member 332 may be implemented as a torsion spring. The elastic member 332 may provide a biasing torque so that the cable release 331 biases the connecting pin 213 to abut the first guide groove 310.

Here, the housing 300 may include a stopper 350 (see FIG. 12) to prevent the cable release 331 from rotating further beyond a set area or angle. The stopper 350 may be arranged to interfere with one side of the cable release 331, stopping the rotation at the point of interference. Therefore, although the biasing torque of the elastic member 332 is provided to the cable release 331, the biasing torque is exerted only when the connecting pin 213 is in the second guide groove 320, and not exerted when the connecting pin 213 is in the first guide groove 310.

The rotation prevention part 340 may be disposed adjacent to the restoring part 330 and may rotate to interfere with the rotation direction of the restoring part 330 when the vehicle or door 11 receives an external impact.

Further, as shown in FIG. 4, a front cover 510 may cover the link part 210 from the inside of the handle unit 100 so that the link part 210 is not visible to the outside of the housing 300.

FIG. 6A is a rear view illustrating the operating part and the biasing part of the flush door handle for a vehicle depicted in FIG. 2 in the storage mode, and FIG. 6B is a rear view illustrating the operating part and the biasing part of the flush door handle for a vehicle depicted in FIG. 2 in the open mode.

Referring to FIG. 6A, the first and second rack gears 221 and 222 may be disposed adjacent to each other in the storage mode. In order for the first and second rack gears 221 and 222 to be disposed adjacent to each other, (i) the handle unit 100 may be pressed from the outside, or (ii) the driving part 240 may press the second rack gear 222, or (iii) the protruding part 410 and the engagement part 420 may be engaged with each other without an external force applied.

In FIG. 6A, when the first and second rack gears 221 and 222 come closer to each other, the pinion gear 223 may rotate clockwise, simultaneously rotating the biasing part 230 clockwise and compressing the biasing part 230. In other words, the biasing part 230 may store elastic restoring force as it rotates simultaneously while being engaged with the extension area 225 (see FIG. 4) of the pinion gear 223.

Referring to FIG. 6B, in the open mode, the first and second rack gears 221 and 222 may be moved away from each other. As the pinion gear 223 rotates counterclockwise, the first and second rack gears 221 and 222 may move in the direction away from each other.

In FIG. 6B, the biasing part 230 may provide an elastic restoring force that acts counterclockwise, rotating the pinion gear 223 counterclockwise so that the first and second rack gears 221 and 222 may move away from each other. The biasing part 230 may be in a relaxed state, after using the stored elastic restoring force.

Figure 7:
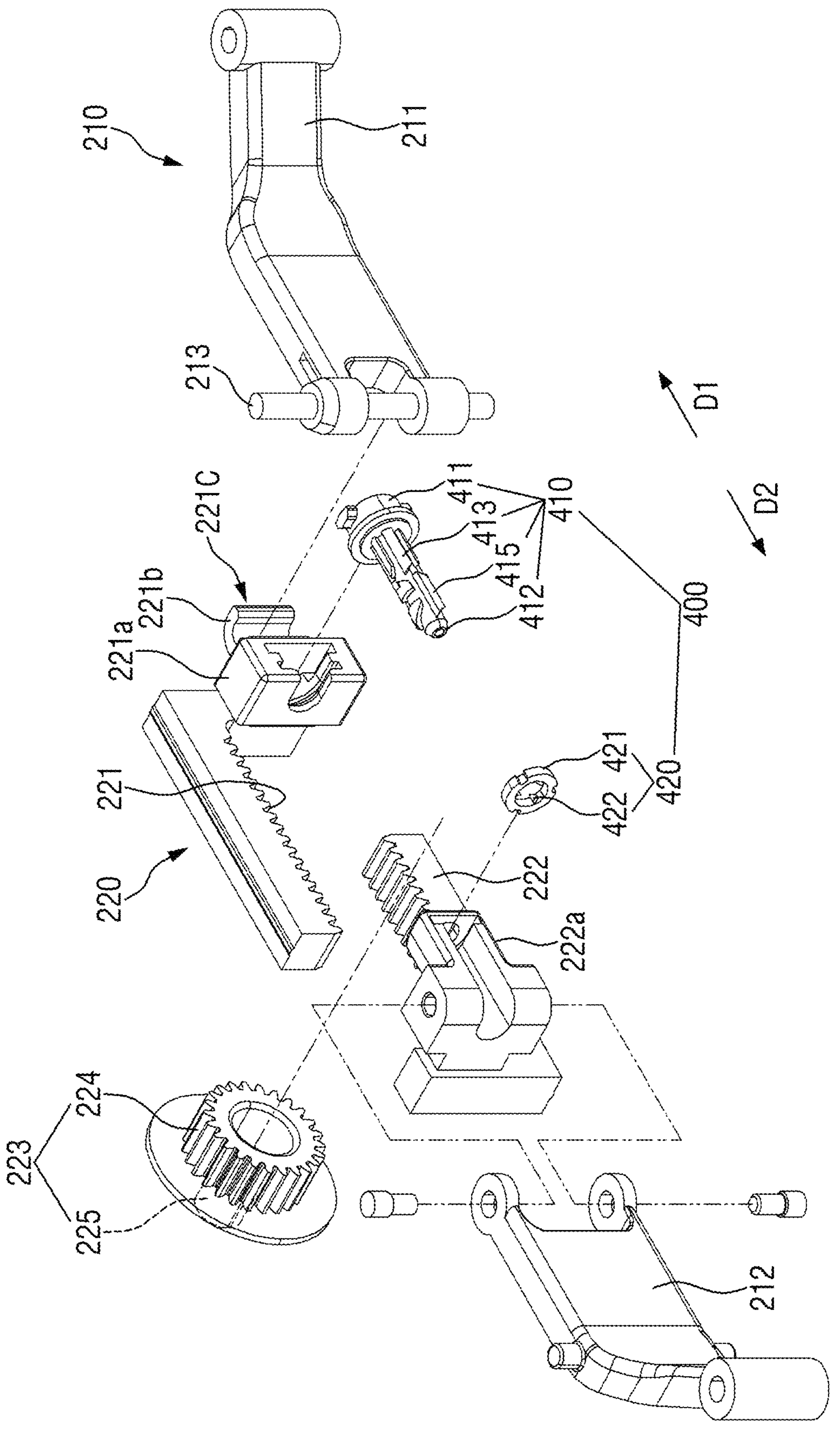
FIG. 7 is a partially enlarged view illustrating the operating part and a mode setting unit of the flush door handle for a vehicle depicted in FIG. 4.
Figure 8:
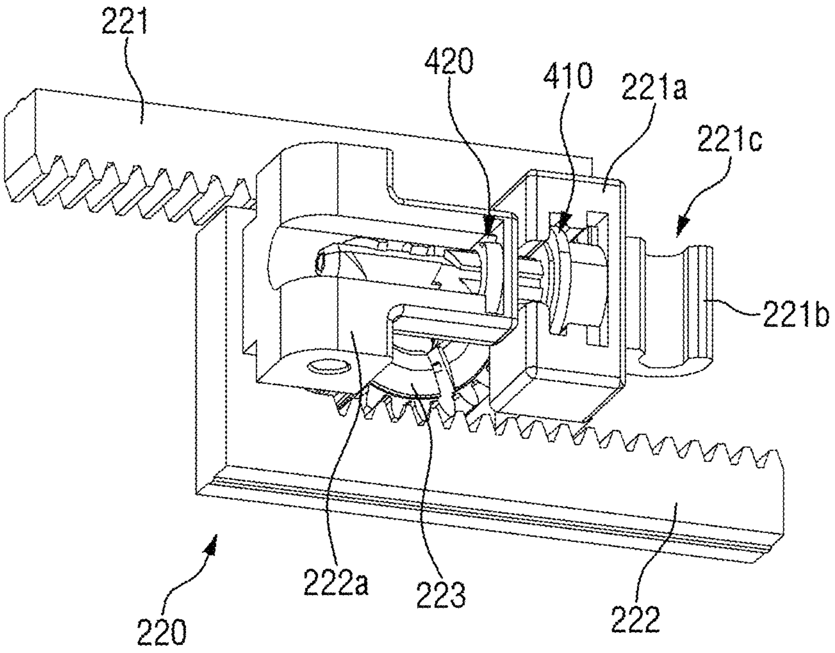
FIG. 8 is a perspective view illustrating the operating part and the mode setting unit of the flush door handle for a vehicle depicted in FIG. 7 in the storage mode.
Figure 9:
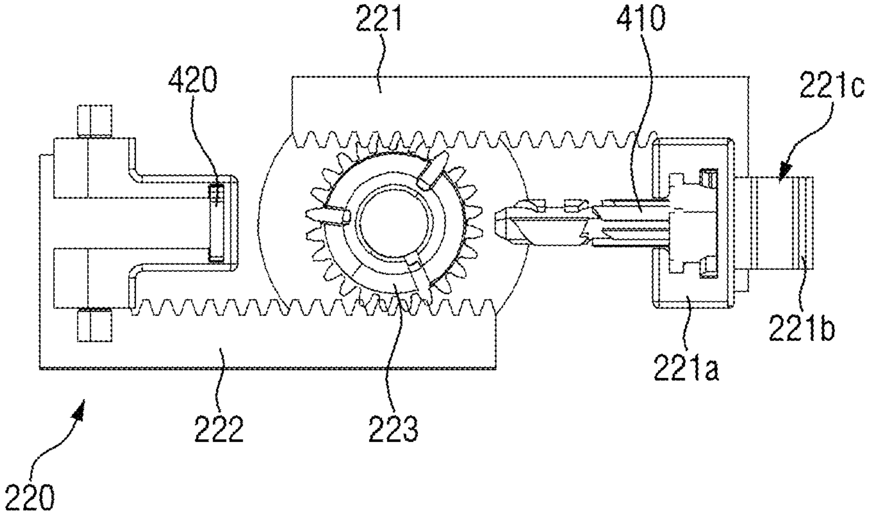
FIG. 9 is a view illustrating the operating part and the mode setting unit of the flush door handle for a vehicle depicted in FIG. 7 in the open mode.

FIG. 7 is an enlarged partial view illustrating the operating part and the mode setting unit of the flush door handle for a vehicle depicted in FIG. 4, FIG. 8 is a perspective view illustrating the operating part and the mode setting unit of the flush door handle for a vehicle depicted in FIG. 7 in the storage mode, and FIG. 9 is a view illustrating the operating part and the mode setting unit of the flush door handle for a vehicle depicted in FIG. 7 in the open mode.

Referring to FIGS. 7 through 9, the operating part 220 and the mode setting unit 400 may be organically connected to each other and may selectively limit each other's movement by contacting or interfering with each other during the movement.

The first and second rack gears 221 and 222 may be engaged via the pinion gear 223 and be configured to move only in opposite directions. For example, when the first rack gear 221 moves to the right, the second rack gear 222 may move to the left. At this time, the protruding part 410, mounted on the first fixing member 221*a*, and the engagement part 420, mounted on the second fixing member 222*a*, may also be configured to move in opposite directions and engage with or disengage from each other. A torque may be applied by the biasing part 230 to the pinion gear 223 in a direction that separates the protruding part 410 and the engagement part 420.

Therefore, when the engaging force between the protruding part 410 and the engagement part 420 is released, the first and second rack gears 221 and 222 may move away from each other, thereby switching to the open mode.

In response to the user pressing the handle unit 100 again, as the first and second fixing members 221*a* and 222*a* come closer together, and the protruding part 410 and the engagement part 420 may engage, the mode setting unit 400 may be engaged. Consequently, the first and second rack gears 221 and 222 may be maintained close to each other, switching to the storage mode.

Figure 10:
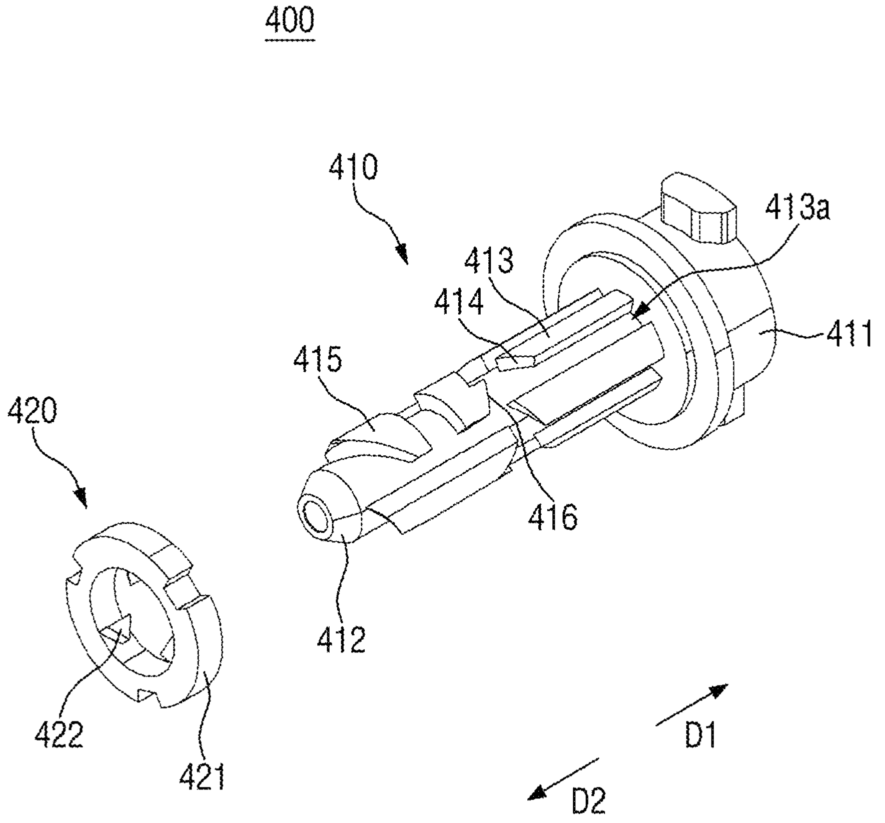
FIG. 10 is a partially enlarged perspective view illustrating the mode setting unit of the flush door handle for a vehicle depicted in FIG. 4.

FIG. 10 is an enlarged partial view illustrating the mode setting unit of the flush door handle for a vehicle depicted in FIG. 4, and FIGS. 11A-11C are reference diagrams illustrating the operation of the mode setting unit of the flush door handle for a vehicle depicted in FIG. 10.

The detailed structure and operation of the mode setting unit 400 will hereinafter be described with reference to FIGS. 10 and 11A-11C.

Referring to FIGS. 10 and 11A-11C, the mode setting unit 400 may include the protruding part 410 and the engagement part 420. Based on the protrusion part 410, the direction in which the engagement part 420 engages with the protruding part 410 is herein defined as the first direction D1, and the direction in which the engagement part 420 disengages from the protruding part 410 is herein defined as the second direction D2.

On the shaft 412, a first inclined surface 414 may be formed at the tip of one of the first guide patterns 413. The first inclined surface 414 may be disposed to be contacted by the key member 422 as the engagement part 420 moves in the first direction D1. Subsequently, when the engagement part 420 continues to move in the first direction D1, the engagement part 420 may rotate further and may move into a groove 413*a* formed between the first guide patterns 413.

Figure 11A:
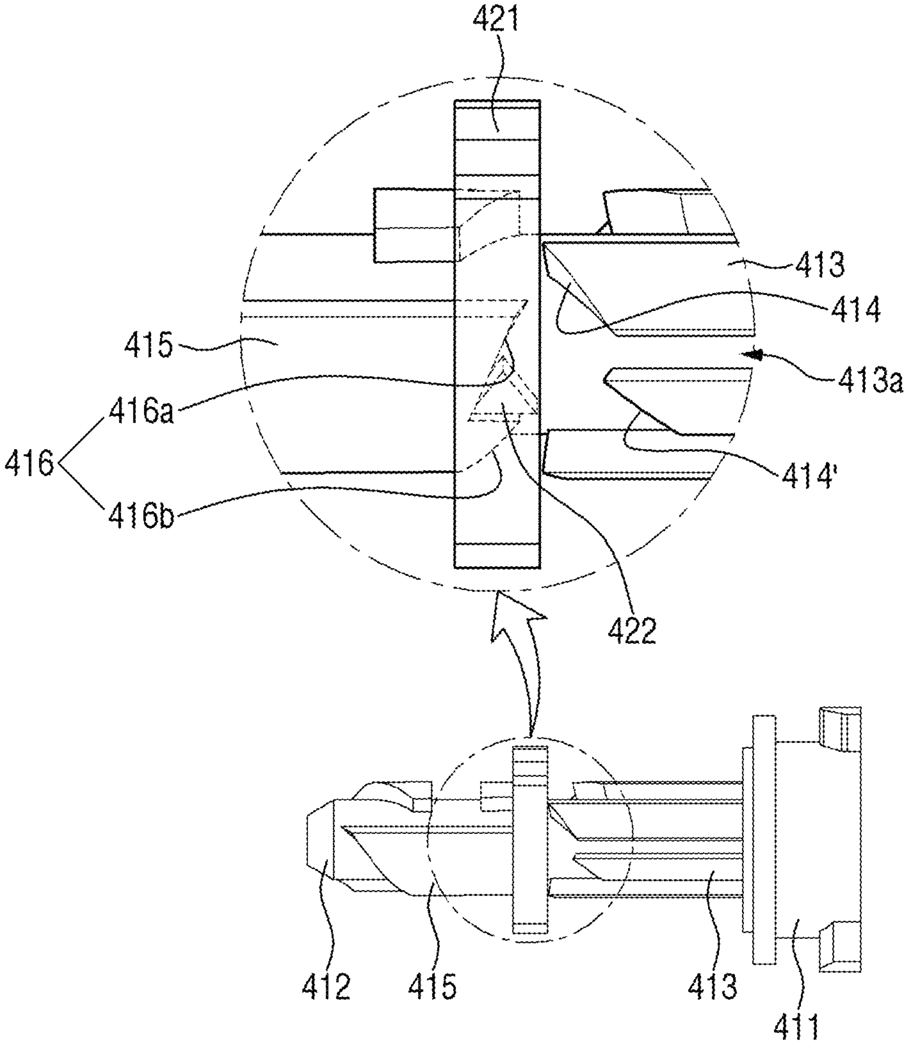
FIGS. 11A-11C illustrate reference diagrams for explaining the operation of the mode setting unit of the flush door handle for a vehicle depicted in FIG. 10.
Figure 11B:
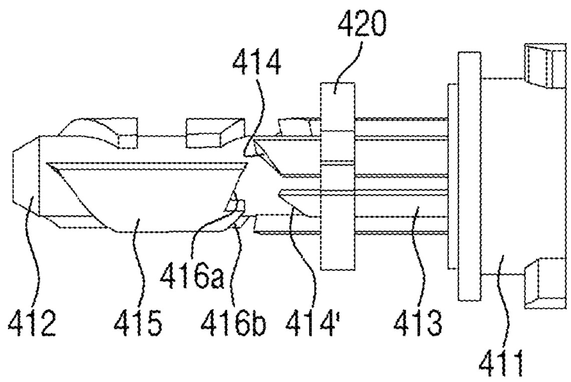

When the pushing force in the first direction D1 is released, the engagement part 420 may move in the second direction D2. This movement of the engagement part 420 may be caused by the aforementioned torque by the biasing part 230. As the engagement part 420 moves in the second direction D2, it may move away from the first guide patterns 413 and may contact the second inclined surfaces 416 of the second guide pattern 415. Each of the second inclined surfaces 416 may include a first tooth 416*a* and a second tooth 416*b*. As the engagement part 420 moves in the second direction D2 along the groove 413*a*, it may first abut the first tooth 416*a* and may be disposed between the first tooth 416*a* and the second tooth 416*b* (i.e., at the valley between the first tooth 416*a* and the second tooth 416*b*). The engagement part 420 may be rotated due to the slope of the first tooth 416*a*. The rotation of the engagement part 420 may occur in the same direction when the engagement part 240 contacts both a first inclined surface 414 and the second inclined surface 416. When the engagement part 420 is disposed on the first tooth 416*a*, this is the state of being switched to the storage mode (FIG. 11A).

Figure 11C:
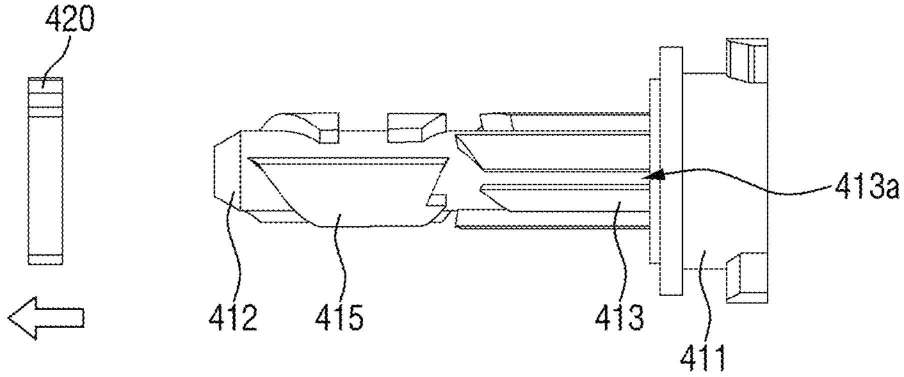

Thereafter, when the user presses the handle unit 100 again, the engagement part 420 may be rotated by abutting another (i.e., next) first inclined surface 414' that is adjacent to the first inclined surface 414 along the rotation direction of the engagement part 420. When the pressing force on the handle unit 100 is released, the engagement part 420 may be disengaged from the protruding part 410 in the second direction D2. This is the state of being switched to the open mode (FIG. 11C).

Herein, the storage mode and the open mode may be alternately switched by each pressing of the handle unit 100.

Figure 13:
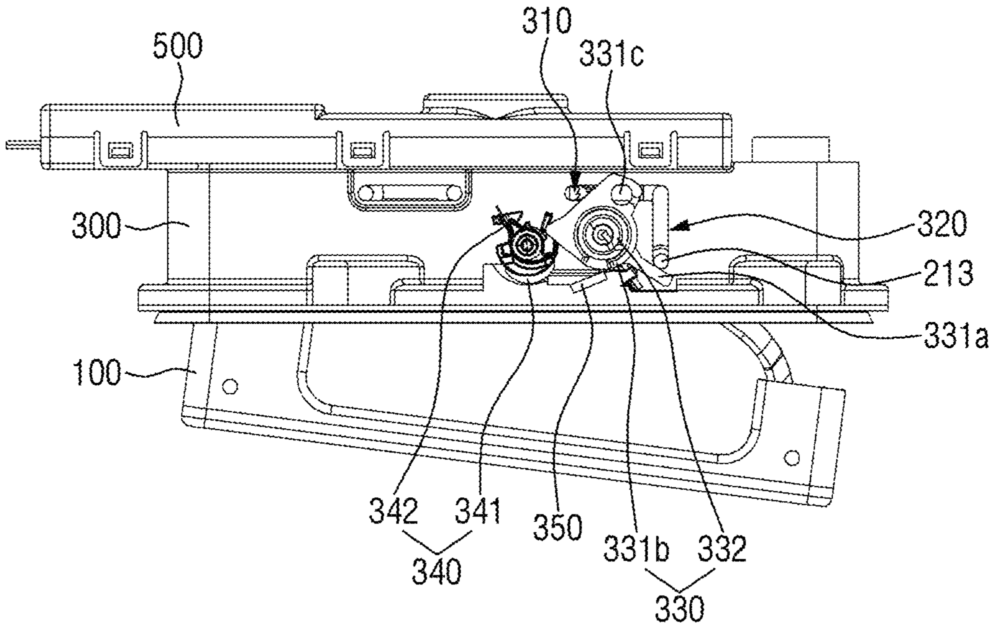
Figure 14:
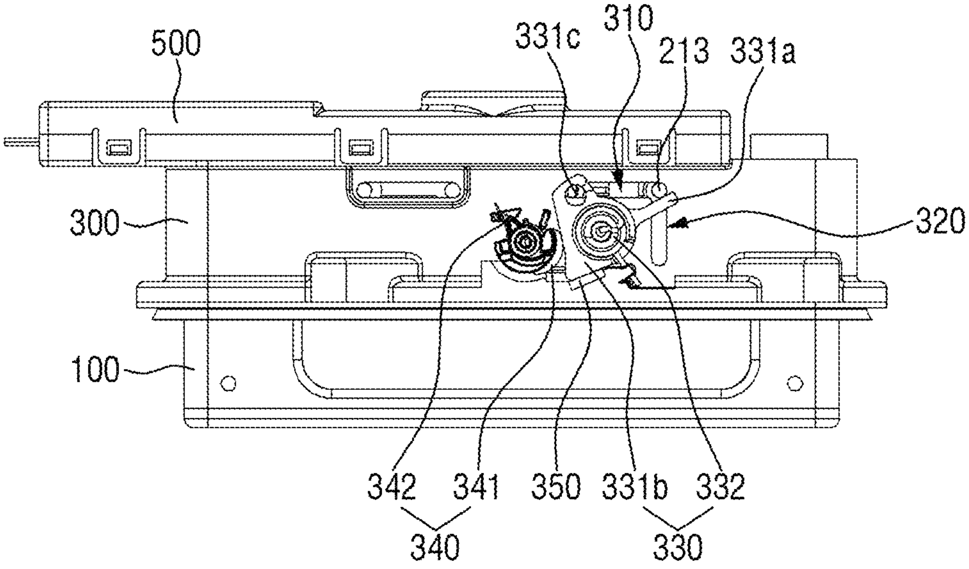
FIG. 14 is a plan view illustrating the operation of the restoring part and a rotation prevention part on the housing of the flush door handle for a vehicle depicted in FIG. 12.

FIGS. 12 and 13 are plan views illustrating the operation of the restoring part provided on the housing of the flush door handle for a vehicle depicted in FIG. 2, and FIG. 14 is a plan view illustrating the operation of the restoring part 330 and the rotation prevention part 340 on the housing of the flush door handle for a vehicle depicted in FIG. 12.

FIG. 12 illustrates the positions of the restoring part 330 and the connecting pin 213 while they are in the open mode, and FIG. 13 illustrates the positions of the restoring part 330 and the connecting pin 213 when the user pulls the handle unit 100 to open the door 11 in the open mode.

When a pulling force is applied by the user to the handle unit 100 in the open mode, the handle unit 100 may simultaneously pull the first link 211, and as the connecting piece 331*c* moves from the first guide groove 310 to the second guide groove 320, pressing the protruding piece 331*a*, the door 11 may be opened via the wire connected to the connecting piece 331*c*. Additionally, when the pulling force on the handle unit 100 is released, the protruding piece 331*a* may press and move the connecting pin 213 toward the first guide groove 310 due to the elastic member 332, thereby returning the handle unit 100 to its original position in the open mode.

Furthermore, the rotation prevention part 340 may be disposed adjacent to the restoring part 330 and may rotate to interfere with the rotation direction of the restoring part 330 in the event of an external impact to the vehicle or door 11.

At this time, the rotation prevention part 340 may be disposed adjacent to the restoring part 330 and may rotate to interfere with the rotation direction of the restoring part 330 in the event of an external impact to the vehicle or door 11. For example, the rotation prevention part 340 may include a weight member 341, which is disposed eccentrically with respect to its rotation center or with a significantly asymmetrical weight center relative to the rotation center, so that it may rotate due to inertia in the event of an impact, and a torsion spring 342, which rotates the weight member 341 so that the weight center of the weight member 341 faces the outward direction of the door 11. Therefore, when an impact is applied from the outside of the door 11, if the weight member 341 rotates from its eccentric rotation center due to inertia, it prevents the rotation of the cable release 331, thereby preventing the door 11 from being opened. Although not depicted in FIGS. 12 through 14, the rotation prevention part 340 may further include an interference piece, which protrudes further along the rotation direction of the weight member 341 to interfere with the rotation of the cable release 331.

Therefore, according to the flush door handle for a vehicle of the present disclosure, the door can be opened by manually exposing the handle unit to the outside of the door even in an emergency situation where the vehicle's power is unavailable or the operation of the driving part is disabled. The opening/closing unit can be manufactured in a compact and lightweight form factor, making it easier to apply to a flush door, and since the driving part is disposed where it does not interfere with the operating part when not pressing the operating part, it avoids interference with the driving part when manually operating the handle unit.

While the technical idea of the present disclosure has been illustrated and described in detail with reference to specific embodiments, the present disclosure is not limited to the specific configurations and operations of these embodiments. Various modifications can be made within the scope of the present disclosure without departing from its spirit. Therefore, such modifications should be considered within the scope of the present disclosure, and the scope of the present disclosure should be determined by the appended claims.

What is claimed is:

1. A door handle for a door of a vehicle comprising:
a handle unit; and
an opening/closing unit that pushes the handle unit to an exterior of a door panel or pull the handle unit to an interior of the door panel,
wherein, in response to the handle unit being pressed toward the interior of the door panel while being laid flush with the door panel, the handle unit protrudes to the exterior of the door panel and switches to an open mode,
wherein, in response to the handle unit being pressed while it is in the open mode, the handle unit retracts to the interior of the door panel and switches to a storage mode,
wherein the opening/closing unit includes a link part, the link part comprising:
a first link, a first end of which is rotatably coupled to a first side of the handle unit; and
a second link, a first end of which is rotatably coupled to a second side of the handle unit, and
wherein the opening/closing unit further includes an operating part, which is configured to:
move a second end of the first link and a second end of the second link away from each other to switch to the open mode; and
move the second end of the first link and the second end of the second link toward each other to switch to the storage mode.

2. The door handle of claim 1, wherein the operating part includes:
a first rack gear, which is connected to the first link;
a second rack gear, which is connected to the second link; and
a pinion gear, which engages simultaneously between the first rack gear and the second rack gear.

3. The door handle of claim 2, wherein the first rack gear and the second rack gear are arranged side by side to face each other with respect to the pinion gear, and are disposed to move linearly in opposite directions according to rotation of the pinion gear.

4. The door handle of claim 2, wherein the opening/closing unit includes a biasing part, which provides a biasing force to cause the first rack gear and the second rack gear to move away from each other.

5. The door handle of claim 4, wherein the pinion gear includes:
an engagement area, which contacts the first rack gear and the second rack gear; and
an extension area, which protrudes from a center of the engagement area and interacts with the biasing part.

6. The door handle of claim 1, further comprising:
a driving part that actuates the operating part to switch between the open mode and the storage mode.

7. The door handle of claim 1, further comprising:
a cover part that covers the operating part.

8. The door handle of claim 5, further comprising:
a mode setting unit interposed between the first rack gear and the second rack gear to selectively limit movement of the operating part when switching from the open mode to the storage mode.

9. The door handle of claim 8, wherein the mode setting unit includes:
a protruding part, which is mounted on one of the first rack gear or the second rack gear; and
an engagement part, which is mounted on the other of the first rack gear or the second rack gear and is disposed to rotate while being engaged with the protruding part.

10. The door handle of claim 9, wherein the operating part includes:
a first fixing member, which is for mounting the protruding part; and
a second fixing member, which is disposed to face the first fixing member and is provided for mounting the engagement part, and
wherein as the first fixing member and the second fixing member move toward each other, the protruding part passes through the engagement part.

11. The door handle of claim 10, wherein the engagement part includes:
a hollow ring member, which is mounted on the second fixing member and is disposed to be rotatable; and
at least one key member, which protrudes from an inner circumferential surface of the ring member.

12. The door handle of claim 11, wherein the protruding part includes:

a head member, which is mounted on the first fixing member;

a shaft, which extends from the head member and protrudes toward the second fixing member;

first guide patterns, which protrude from an outer circumferential surface of the shaft and include first inclined surfaces that are formed to contact the key member in a first direction, the first direction being a direction in which the engagement part engages with the protruding part; and second guide patterns, which protrude from the outer circumferential surface of the shaft and include a plurality of second inclined surfaces formed to contact the key member in a second direction, the second direction being a direction in which the engagement part disengages from the protruding part.

13. The door handle of claim 12, wherein the opening/closing unit is configured such that:

in response to the handle unit being pressed with a pressing force while in the open mode, the key member contacts one of the first inclined surfaces in the first direction, causing the engagement part to rotate, and in response to the pressing force being released, the engagement part is biased toward the second direction by the biasing part to be disposed on one of the second inclined surfaces, thereby switching to the storage mode; and in response to the handle unit being pressed with a pressing force while in the storage mode, the key member contacts one of the first inclined surfaces in the first direction, causing further rotation of the engagement part, and in response to the pressing force being released, the engagement part is biased toward the second direction by the biasing part to abut an adjacent second inclined surface and then be released from the second guide pattern, thereby switching to the open mode.

14. The door handle of claim 12, wherein the first inclined surfaces and the second inclined surfaces are disposed to at least partially overlap with each other along a circumferential direction.

15. The door handle of claim 12, wherein the engagement part is disposed to contact at least one inclined surface from among the first inclined surfaces and the second inclined surfaces when moving between the first guide patterns and the second guide patterns in the first direction or the second direction.

16. The door handle of claim 10, further comprising:

a housing for accommodating the opening/closing unit and guiding movement of the handle unit.

17. The door handle of claim 16, wherein the operating part includes a connecting member, which protrudes from the first fixing member and is connected to one end of the link part.

18. The door handle of claim 17, wherein the connecting member includes a connecting groove, which interferes with a connecting pin coupled to the one end of the link part along a first direction, the first direction being a direction in which the engagement part comes closer to the protruding part, or along a second direction, the second direction being a direction in which the engagement part moves away from the protruding part, and wherein interference between the connecting pin and the connecting groove is released along a third direction, the third direction being perpendicular to the first direction and the second direction.

19. The door handle of claim 18, wherein the housing includes:

a first guide groove, which is formed along the first direction and the second direction and in which the connecting pin is at least partially inserted to guide movement of the connecting pin; and a second guide groove, which is disposed to communicate with an end of the first guide groove and guides movement of the connecting pin along the third direction.

20. The door handle of claim 19, wherein in the open mode, in response to the handle unit being pulled, the connecting pin moves along the second guide groove, and the door is opened.

21. The door handle of claim 19, wherein the housing further includes a restoring part, which is disposed to be rotatable relative to the housing and elastically limits the movement of the connecting pin.

22. The door handle of claim 21, wherein the restoring part includes:

a protruding piece, which abuts the connecting pin as the connecting pin moves from the first guide groove to an end of the second guide groove;

a support piece, which supports the protruding piece to be rotatable on the housing;

a cable release, which includes a connecting piece that protrudes in a different direction from the protruding piece on the support piece and to which a cable is connected; and an elastic member, which is coupled to the support piece and elastically rotates the cable release such that the connecting piece is disposed by the protruding piece at a junction between the first guide groove and the second guide groove or on the first guide groove.

23. The door handle of claim 22, wherein the housing further includes a rotation prevention part, which is disposed adjacent to the restoring part to be rotated by an external impact on the housing, and wherein the rotation prevention part rotates to interfere with a rotation direction of the cable release when the external impact is received.

* * * * *